United States Patent [19]

Mulholland et al.

[11] Patent Number: 5,018,316

[45] Date of Patent: May 28, 1991

[54] POLISHING FIXTURE FOR OPTICAL FIBER OF PUSH-PULL CONNECTOR

[75] Inventors: Denis G. Mulholland, Lancaster; Ronald R. Schaffer; Gary N. Warner, both of Harrisburg, all of Pa.

[73] Assignee: AMP Incorporated, Harrisburg, Pa.

[21] Appl. No.: 541,556

[22] Filed: Jun. 21, 1990

[51] Int. Cl.⁵ .................................. B24B 41/06
[52] U.S. Cl. ............................. 51/216 R; 51/277; 51/217 R
[58] Field of Search ............ 51/216 R, 216 LP, 216 P, 51/217 R, 217 L, 277, 283 R, 283 E, 284 R, 284 E, 131.3, 125

[56] References Cited

U.S. PATENT DOCUMENTS

| | | | |
|---|---|---|---|
| 4,272,926 | 6/1981 | Tamulevich | 51/216 R |
| 4,330,965 | 5/1982 | Clark | 51/217 R |
| 4,498,260 | 2/1985 | Doty | 51/217 R |
| 4,539,776 | 10/1985 | Weaver, Jr. | 51/131.3 |
| 4,648,688 | 3/1987 | Ashman et al. | 350/96.20 |
| 4,693,035 | 9/1987 | Doyle | 51/277 |
| 4,776,136 | 10/1988 | Abendschein et al. | 51/216 R |
| 4,944,079 | 7/1990 | Nakamura et al. | 51/283 R |

FOREIGN PATENT DOCUMENTS 60-218932 9/1985 Japan.

Primary Examiner—Robert A. Rose

[57] ABSTRACT

A one-piece molded polishing fixture 9 includes a body member 73 having front disc-shaped flat surface 74 with web of gutters 75. The body member 73 further has a bore extending therethrough in which the front end 76 of a fiber optic member 8 may be disposed with the front surface 76 of the member 8 extending outwardly beyond the front of the flat surface 74. The polishing fixture 9 further includes means for securing the body member 73 to an optical fiber connector 3 with held optical fiber member 8. This said means comprises an alignment sleeve 78 and at least two resilient catch pieces 77 of cantilever form.

7 Claims, 3 Drawing Sheets

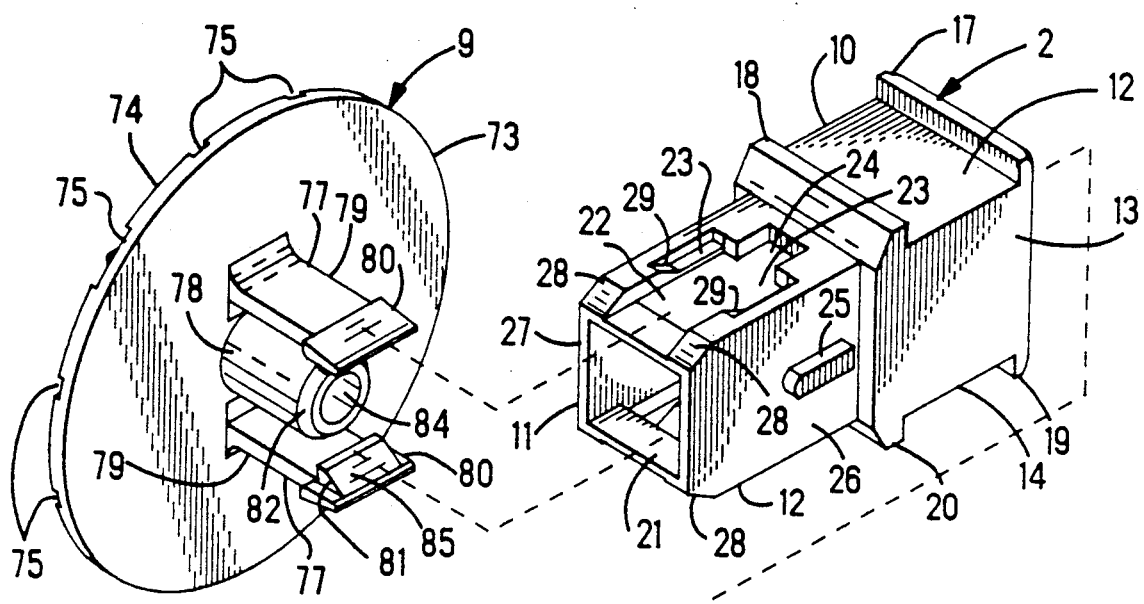
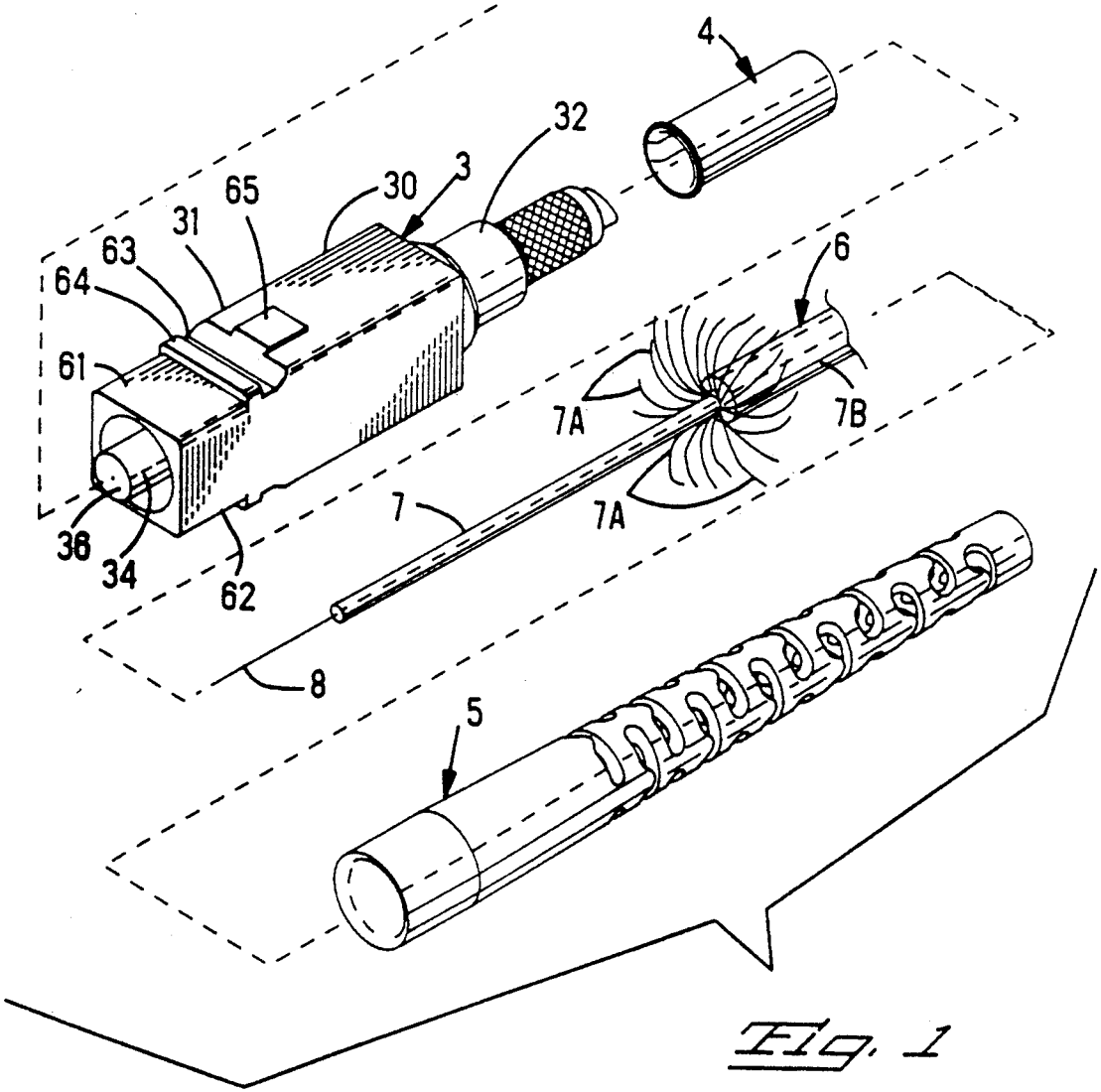
Fig. 1

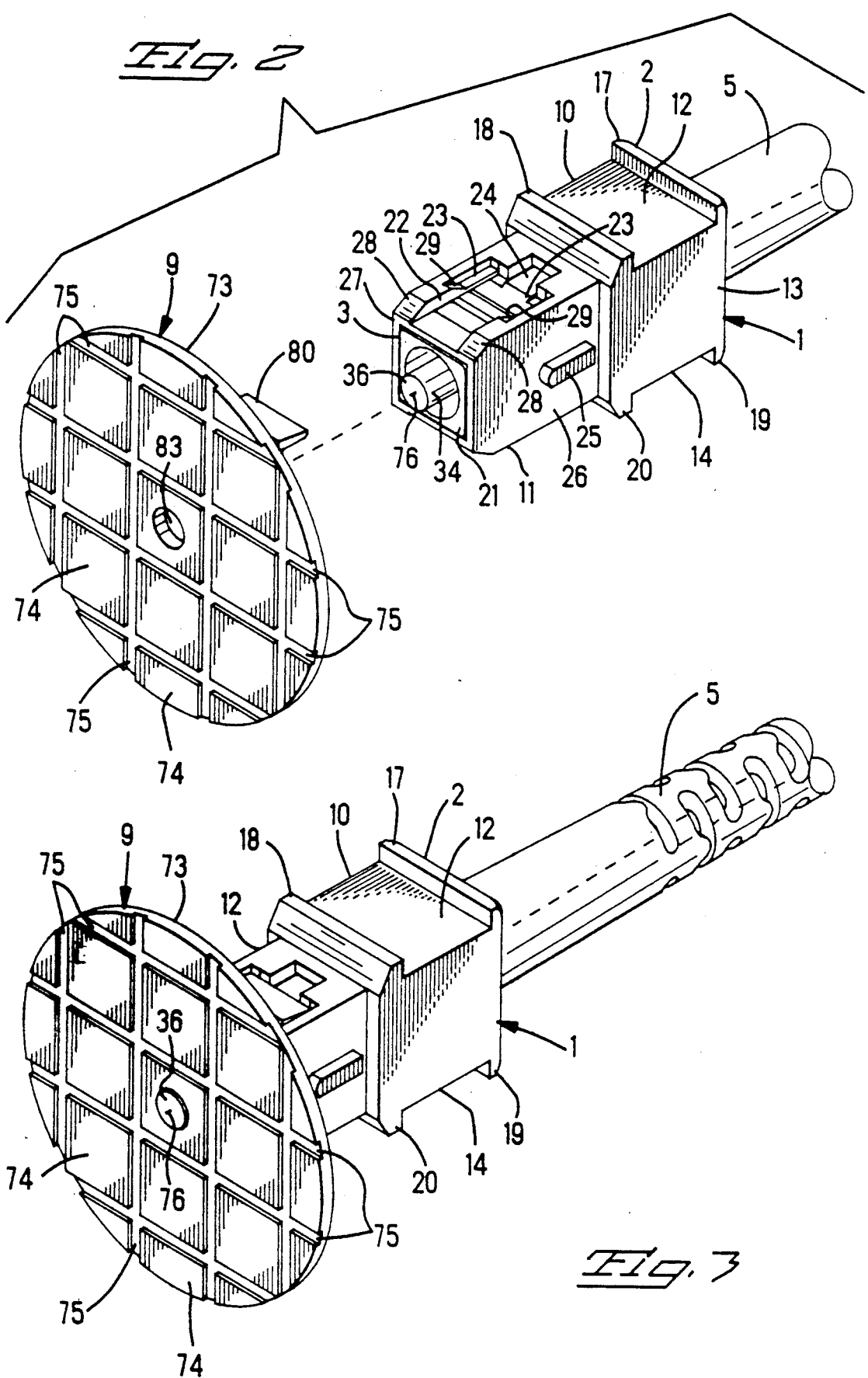

POLISHING FIXTURE FOR OPTICAL FIBER OF PUSH-PULL CONNECTOR

FIELD OF THE INVENTION

The present invention relates to a polishing bushing for polishing optical fibers, particularly for polishing of optical fibers of push-pull connectors.

BACKGROUND OF THE INVENTION

Various types of fiber optic connections between adapters and plugs are known, including screw lock types, bayonet locks and the push-on lock type also known as push-pull coupling type. Umeki, et al, Japanese Showa 60-218932 discloses a push-pull coupling type. It includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule. The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part. The plug frame also has a finger grip mounted on its outside with raised parts. When the ferrule of the plug frame is inserted into or pulled from the alignment sleeve, the raised parts of the plug frame contact the protrusions of the cantilever form and push the resilient claws to the outside allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

It is desireable that the transfer of light between the fibers of the push-pull coupling plug connector and the fiber of the adapter be accomplished with little loss of signal; i.e. with low insertion loss. Insertion loss may result from several factors, including the presence of a gap or separation between the ends of the connected fibers. Specifically, some light is lost if the end faces of two fibers are separated because light diverges as it radiates from the end of a fiber. In addition, fiber to fiber separation results in an insertion loss due to Fresnel reflections at the two glass-air interfaces between the spaced fibers. Accordingly, it is particularly important that end faces of the connected fibers of the plug and of the adapter be maintained in virtual contact with one another to minimize these losses. Contact between the fibers is improved by polishing of the fiber end faces. Typically, the end face of a fiber is polished by mounting the connector with protruding fiber to a polishing tool. The tool is then moved over a polishing medium, by hand, until the end face of the protruding fiber is satisfactorily polished.

The fibers of the push-pull coupling plug type of connectors are difficult to polish because of insecure connections between known polishing tools and the push-pull connector. With known polishing tools the polishing process is inconsistent and the results are unpredictable. For example, the fibers are often polished to such an extent that the ends of the fibers become slightly recessed within the ceramic sleeve in which they are supported. The recesses result in a gap between connected fibers which is unacceptable in connector systems. Further, with known polishing tools, it is required that skilled personnel exercise substantial care to produce acceptably polished fibers with connectors of the push-pull type.

SUMMARY OF THE INVENTION

The present invention provides a polishing fixture for polishing optical fibers in a controlled, repeatable manner. The polishing fixture is particularly designed for polishing the end face of an optical fiber member which is carried within an optical fiber connector of the push-pull plug assembly type. Such plug assembly includes a plug housing with spacing through its body at a surface of a forward section, and with defined exterior profile at a rearward section. Further included is a connector assembly accommodated by and substantially within the plug housing. The connector assembly has, disposed at one exterior surface thereof, ridge and slot and, in conjunction therewith, a tab. The ridge, slot and tab are exposed through the spacing at the surface of the forward section of the plug housing. Further included is a ferrule for fixing an optical fiber on a center axis thereof. The ferrule is accommodated within the connector assembly.

These optical fiber connectors connect optical fiber cables which include at least one optical fiber and a load bearing portion. Additionally, the optical fiber connector may include a shell and at least one reciprocating holder in the shell for holding a corresponding optical fiber member. The corresponding optical fiber is connected to the reciprocating holder and is slidable within the load bearing portion. The load bearing portion is anchored to the shell and the corresponding optical fiber is reciprocable together with the reciprocating holder, and is reciprocable with respect to the shell and the load bearing portion.

The present invention relates to a one-piece molded polishing fixture for polishing the front end of the optical fiber member, extending from the bore of a ferrule member of the optical fiber connector. The polishing fixture comprises a body member having front disc-shaped surface with web of gutters. A profiled bore extends through the body member. A profiled front end of the optical fiber member may be disposed within the profiled bore of the body member with a front surface of the optical fiber member extending outwardly beyond the front flat surface. Further included is means for securing the body member to the optical fiber connector. The means comprises an alignment sleeve and at least two resilient catch pieces of cantilever form. The catch pieces have extending tab bodies and terminate in protrusions and beveled lip structures. The alignment sleeve may have an annular beveled front edge. The lips of the resilient catch pieces may be beveled inwardly to facilitate lead-in to the openings of the plug housing of the fiber connector. The protrusions of the resilient catch pieces may be wider than the tab bodies of the catch pieces.

Further, the polishing fixture of the present invention is useable with an optical fiber connector as described above which includes a sheath for the corresponding optical fiber member on the reciprocating holder and the corresponding optical fiber extends along the sheath after removal of a rear-end portion of the sheath. Further, anchoring means may connect the shell and the load bearing portion for anchoring the load bearing portion to the shell. A compressible biasing spring may urge against the reciprocating holder and urge the shell to retract the sheath along the shell. Finally, a strain relief may be provided encircling at least a portion of the shell and at least a portion of the cable projecting from the shell.

BRIEF DESCRIPTION OF THE DRAWINGS

FIg. 1 is a perspective view, partially exploded, of a polishing fixture, an optical fiber cable and a push-pull coupling type of connector.

FIG. 2 is a perspective view of polishing fixture, optical fiber member and plug connector showing attachment of the bushing mated to the front face of the connector.

FIG. 3 is a perspective view showing the polishing fixture mated to the connector.

DESCRIPTION OF A PREFERRED EMBODIMENT

Figure 4:
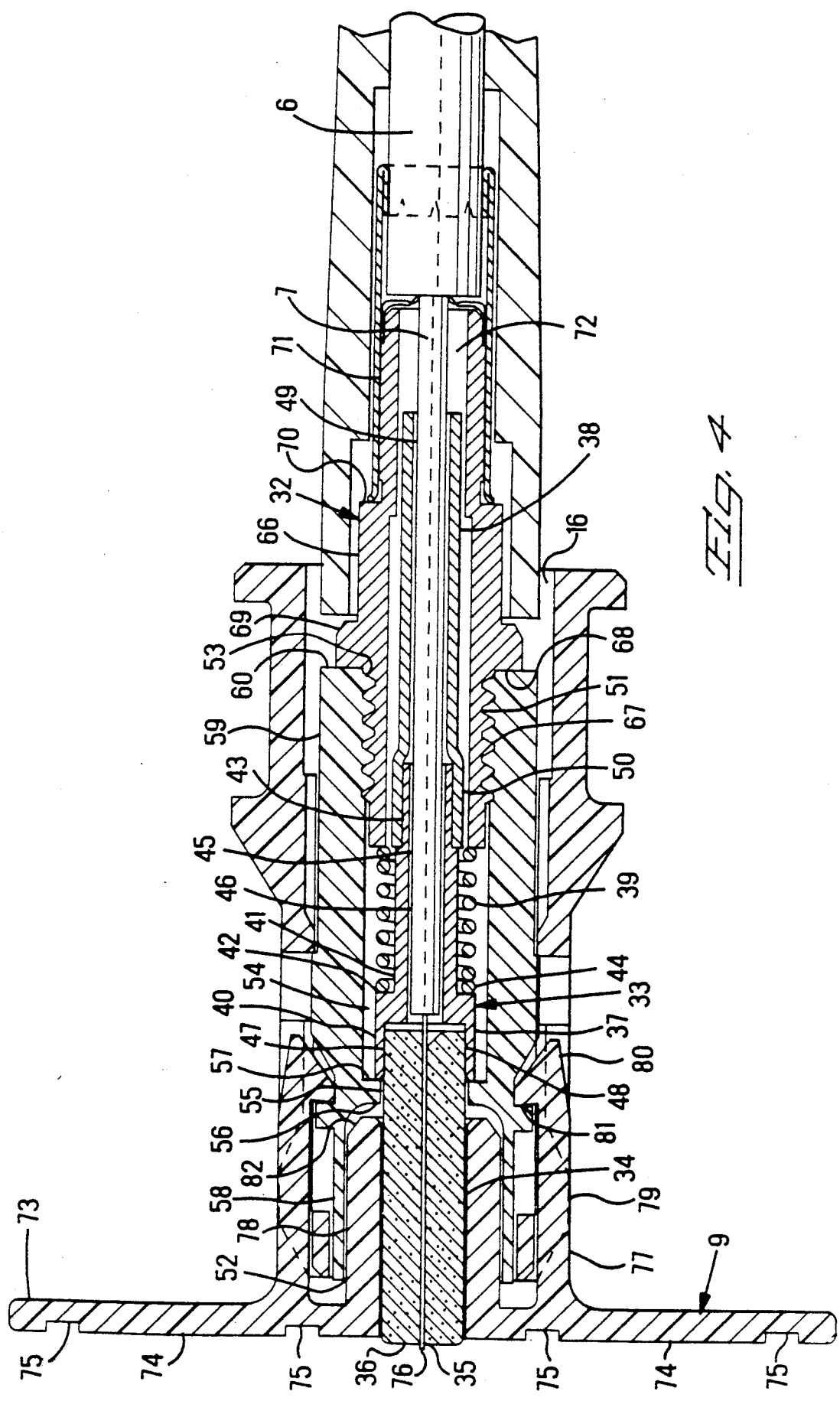
FIG. 4 is an enlarged elevation view, in section, of the parts illustrated in FIG. 3.

The preferred embodiment of the present invention is a one-piece molded polishing fixture for polishing a front end of an optical fiber member extending from the bore of a ferrule member of the simplex optical fiber connector shown in FIGS. 1, 2, 3, and 4. Referring to FIGS. 1, 2, 3, and 4, is shown a plug assembly 1 of the push-pull type comprising a plug housing 2 and a connector assembly 3. Shown also is crimp ferrule 4 and tubular strain relief body 5 for encompassing optical fiber cable 6. The cable 6 includes an elongated central optical fiber member 8 concentrically encircled by a buffer 7, together comprising a buffer covered fiber. The cable 6 further includes a load bearing portion 7A in the form of elongated strength members 7A that extend lengthwise of the cable 6. The strength members 7A are distributed over the outer diameter of the buffer covered fiber 8. The cable 6 further includes an outer jacket 7B of polymeric material enclosing the strength members 7A. Parts of the cable 6 are cut away, as shown, to provide; a length of fiber 8 projecting from the buffer 7 of the cable 6, and a length of the buffer covered fiber 7, 8 projecting from the strength members 7A, and lengths of the strength members 7A projecting from the jacket 7B. The buffer covered fiber 7, 8 is slidable within the jacket 7B and within the surrounding strength members 7A. Further shown is one-piece molded polishing fixture 9.

As shown the plug housing 2 of plug assembly 1 has rear section 10 and forward section 11. Rear section 10 is a tubular sleeve comprising four flat surface areas 12, 13, 14, and 15 (not shown) and formed passageway 16 for receiving connector assembly 3. Top surface 12 and bottom surface 14 have corresponding raised ridges 17 and 18 and 19 and 20 at edges of each surface 12 and 14. Forward section 11 is integral with rear section 12 to form a single body, the plug housing 2. Forward section 11 is also a tubular sleeve with passageway 21. It has shaped openings 22 with notches 23 and 24 to receive and dispose slots 63, ridges 64, and raised tabs 65 of connector assembly 3, as hereinafter described, and tabs 25 on opposite opposing faces 26 for fit to the slot of an adapter when in use. Shown also are beveled edges 28 to the front of plug housing 2, and beveled following edges 29 which lead into notches 23.

As shown in FIGS. 1, 2, 3, and 4, the connector assembly 3 includes; a bipartite shell 30 comprised of a front plastic shell portion 31 and a rear metal shell portion 32. Also shown is a holder 33 for the optical fiber and buffer 7, 8, comprised of a ceramic alignment ferrule 34, having bore 35, and front end 36 and further including metal body 37, sheath 38, and biasing spring 39 of coil form.

The metal body 37 of holder 33 includes an enlarged front end 40 with an external hexagonal cross section, a reduced external diameter intermediate portion 41 intersecting at a rear facing shoulder 42 of the enlarged front end 40, and a rear end 43 with a reduced external diameter. The coil spring 39 is assembled as shown, to encircle the reduced external diameter portion 41 with a front end 44 of the coil spring 39 engaged and biased against the shoulder 42 The metal body 37 further includes an axial passageway 45 extending from the rear end 43. The passageway 45 has axial bore 46 and an enlarged diameter counterbore 47 in the front end 40. The counterbore 47 is aligned to receive a rear end 48 of ceramic alignment ferrule 32 which is press fit into the counterbore 47.

The sheath 38 is a length of flexible plastic or metal tubing having a hollow interior 49, a front end 50 assembled to encircle the reduced diameter rear end 43 of the metal body 37, and a rear end portion 51. The sheath 38 is held onto the body 37 by friction or interference fit.

The front plastic shell portion 31 of connector assembly 3 includes an axial cavity 52 having an enlarged diameter rear end 53 that is internally threaded, an intermediate portion 54 having a hexagon shaped periphery, and a reduced diameter front portion 55 extending through an end wall 56 of the front body portion 31. Enlarged diameter rear end 53 is internally threaded for fit of rear shell portion 32 as hereinafter described. However, it should be pointed out that although this present embodiment shows attachment by threading, rear shell portion 32 may be attached to front shell portion 31 by other conventional means such as by means of glue or adhesive or ultrasonic connection of one part to the other. A rear facing, radially extending internal shoulder 57 is defined at the intersection of the diameter portions 54 and 55. A rectangular hood 58 with an enlarged internal diameter extends forwardly from the front of the end wall 56. Further, the front shell portion 31 includes a rear end 59 forming a rear facing external shoulder 60. Referring to FIGS. 1, 2, and 3, front shell portion 31 at the upper 61 and lower 62 surfaces of its outer profile has slots 63 and ridges 64 for engaging the lips 81 of resilient catch pieces 77 of polishing fixture 9, described below, and tabs 65 which impose outwardly. When connector assembly 3 is fitted within plug housing 2, slots 63 and ridges 64 are exposed by shaped openings 22 of the forward section 11 of plug housing 2. Tabs 65 nestle into notches 24 of the shaped openings 22 and ridges 64 fit into notches 23 to prevent connector assembly 3 from escaping out of plug housing 2.

The rear metal shell 32 of connector assembly 3 includes a front end 66, with an externally threaded forward portion 67. The front end 66 extends to a front facing external shoulder 68 defined by an exterior circumferential flange 69, a rear facing external shoulder 70 forward of a reduced external diameter end portion 71. The reduced diameter end portion 71 defines a cable anchoring portion. Rear shell portion 32 has axial passageway 72.

The holder 33 and the biasing spring 39 are assembled together and are assembled into the cavity 52 of the front shell portion 31, with the alignment ferrule 34 projecting through the end wall 56, forward of the end wall 56, and the hood 58, and with the sheath 38 projecting outwardly of the rear end 71 of the rear shell portion 32. The axial passageway 72 of the rear shell portion 32 is slidably assembled over the sheath 38 and is threadably advanced along the internally threaded rear end 59 of the front body portion 31 until the shoulder 68 engages the rear end 59 of the front shell portion 31. The biasing spring 39 is in compression between the front end 66 of the rear shell portion 32 and the shoulder 42 of the metal body 37. Thereby the holder 33 is biased forward by the spring 39 and is mounted for axial slidable displacement and reciprocation with respect to the bipartite shell 30. The hexagonal front end 40 of the metal body 37 is confined by the hexagonal periphery of the cavity 52 to prevent rotation of the holder 33 in the cavity 52. The polishing fixture 9 includes a body member 73 having front disc-shaped flat surface 74 with bore 83 and a web pattern of gutters 75. The polishing fixture 9 has a profile bore extending therethrough in which the profiled front end 76 of the fiber optic member 8 is disposed. The polishing fixture 9 is further adapted with resilient catch pieces 77 provided as a pair and cylindrical alignment sleeve 78. Each resilient catch piece 77 is of cantilever form having tab section 79, protrusion 80 and beveled lip 81. In the embodiment shown, a single surface 85 of lip 81 is beveled. However, in another embodiment, the lip 81 would have side bevels to facilitate lead-in to shaped passageway 22 of the plug housing 2 as fixture 9 is connected to plug housing 2 as hereinafter discussed. Alignment sleeve 78 has axial bore 84 and beveled front edge 82.

Assembly of the connector assembly 3 to the optical fiber cable 6 is described as follows. The cable 6 is passed successively along the interiors of the strain relief boot 5 and the crimp ferrule 4. A quantity of a known, commercially available adhesive is deposited in the metal body 37 of the holder 33. For example, the adhesive may be injected by a syringe having an elongated hollow needle. The needle is introduced into the rear portion 51 of the open tubular sheath 38. The rear end portion 51 of the sheath 38 projects outwardly from the cable anchoring portion 71 of the shell 30, and sheaths the needle during entry and withdrawal from the sheath 38. The shell 30 is protected against touching by the needle and against deposition of adhesive. The needle is passed substantially along the interior of the sheath 38 before depositing the quantity of adhesive within the metal body 37 of the holder 33. The adhesive is deposited near the front end 40 of the metal body 37, adjacent to the alignment ferrule 34 and remote from the open rear end portion 51 of the sheath 38. The sheath 38 prevents leaking of the adhesive from the holder 33 and prevents the adhesive from spreading over the spring 39 and the shell 30.

If the sheath 38 is flexible plastic, then following withdrawal of the needle, the alignment ferrule 34 is pressed against a stationary surface, for example, a table, not shown, causing the holder 33 to be slidably displaced, compressing the coil spring 39, and projecting the rear end portion 48 of the sheath 38 further outward from the rear end 71 of the rear shell portion 32. The projecting rear end portion 51 of the sheath 38 is then cut away and removed from the connector assembly 3. Upon expansion of the coils of the biasing spring 39, the sheath 38 is retracted within the shell 30. The buffer covered fiber 7, 8 of the cable 6 is assembled into the rear end 71 of the metal shell 32 and into and along the sheath 38. The sheath 38 internal diameter receives and guides the buffer covered fiber 7, 8 along the passageway 45 of the body 37. The entry of the passageway 45 guides the fiber 8 of the cable 6 into the bore 46 of the alignment ferrule 34. The periphery of the entry encircles and supports the buffer covered fiber 7, 8. The front end 76 of the fiber 8 is exposed at a front end of the bore 35 of the ferrule 34 and is finished with an optical face as hereinafter described. The sheath 38 closely encircles the buffer covered fiber 7, 8 to prevent wicking of the adhesive along the buffer covered fiber 7, 8 to such an extent that adhesive would leak from the open rear end of the sheath 38. The adhesive will be brought into contact with and will coat the fiber 8 and the buffer covered fiber 7, 8, and further, the adhesive will be urged forward of the holder 33 by the buffer covered fiber 7, 8, as the buffer covered fiber 7, 8 moves forward of the sheath 38 and of the body 37 and of the alignment ferrule 34. It is not necessary for the adhesive to wick in a direction rearward of the buffer covered fiber 7, 8 or rearward of the holder 33, since the adhesive is desired only to bond the buffer covered fiber 7, 8 within the holder 33, and the fiber 8 in the alignment ferrule 34.

The internal diameter of the shell rear end 71 is smaller than the external diameter of the cable jacket 7B. Thus, the jacket 7B remains outside of the shell 30, while the shell rear end 71 opposes a front end of the cable jacket 7B. The strength members 7A are placed to overlap the exterior of the shell rear end 71. The crimp ferrule 4 is displaced along the cable 6 to a position concentrically encircling the shell rear end 71. Pressure is radially applied on the crimp ferrule 4 to compress the ferrule radially inward to clamp the strength members 7A between the ferrule 4 and the shell rear end 71. Thereby, the strength members 7A are anchored to the shell rear end 71. The strain relief boot 5 is advanced along the cable 6 to encircle the ferrule 4 and the jacket 7B of the cable 6 where the jacket 7B projects adjacent to the shell 30. The buffer covered fiber 7, 8 and the holder 33 are joined together as a unit by adhesive for reciprocation and axial slidable displacement with respect to the shell 30, the strength members 7A and the jacket 7B of the cable 6. The end 36 of the alignment ferrule 34 engages a portion of the complementary connector and is slidably biased rearwardly of the connector 3 against the bias of the coil spring 35. The bias of the coil spring 35 will urge the end 32A of the ferrule 32 in a direction forwardly of the connector 3 and will engage against the portion of the complementary connector, to maintain a desired alignment of the optical face of the fiber 8 with the portion of the complementary connector.

To polish the optical fiber utilizing the polishing fixture of the present invention the connector assembly 3 is first firmly supported. A scribe tool is then used to lightly scribe the fiber member 8 and the fiber member 8 is pulled away from the connector 3. General pressure is applied to the fiber optic member front end 76 to test for movement. If the fiber optic member 8 does not move in an axial direction then too much epoxy has been used and the cable 6 must be reterminated. If the member 8 has some movement then it is ready to be installed in the polishing bushing. The ceramic ferrule 34 is inserted through bore 84 of sleeve 78 and into the bore 83 of the disc-shaped body 73 with the alignment ferrule 34 being received within the cylindrical alignment sleeve 78 of the polishing fixture 9. As the ferrule 34 is inserted, each beveled leading edge 28 of forward section 11 of connector assembly 3 contacts a respective protrusion 80 of each resilient catch piece 77, causing the protrusion 80 to rise along the bevel 28, causing lip 81 to travel over each ridge 64 and to seat within each of slot 63 of front shell portion 31.

A polishing pad is placed on a polishing plate and polishing film is added onto the pad. Beginning with light pressure, the ceramic end face 36 of the ferrule 34 and the front face 76 of the fiber optic member 8 are polished on the film by moving the ceramic tip and the transmission member in a figure eight pattern on the polishing film. After polishing, the ceramic tip 36 and fiber optic front face 76 are observed under microscope. An acceptable polished face 76 will show fine polishing scratches, without large pits although small peripheral chips may be permissible. Large chips appearing in the center of the fiber mean that further polishing is required or that the end face is unacceptable and the fiber must be reterminated.

On disconnect of the fiber member 8, rearward force causes beveled following edges 29 to impose against each protrusion 80 of the polishing fixture 9, to lift each catch piece 77 thus disengaging each of lip 81 from respective slot 63 and ridge 64 of connector assembly 3 thereby permitting withdrawal of the plug assembly 1 from the polishing fixture 9.

While what has been described constitutes a presently preferred embodiment of the invention, it should be recognized that the connector 3 may take numerous other forms and the polishing fixture may be utilized as other embodiments as well, so long as the polishing fixture 9 is characterized by a body member 73 having front disc-shaped flat surface 74 with web of gutters 75 and a bore 83 extending therethrough, and further includes an alignment sleeve 78 and at least two resilient catch pieces 77 of cantilever form terminating in protrusions 80 and in lip structures 81. Accordingly it should be understood that the invention is to be limited only insofar as required by the scope of the following claims.

We claim:

1. A one-piece molded polishing fixture for polishing a front end of a fiber optic member extending from the bore of a ferrule member of an optical fiber connector, comprising; a body member having front disc-shaped flat surface with web of gutters and a bore extending therethrough in which a front end of the fiber optical member is to be disposed with a front surface of the fiber optical member extending outwardly beyond the said front flat surface; and means for securing the body member to the optical fiber connector, wherein said means for securing the body member and connector comprises;

an alignment sleeve and at least two resilient catch pieces of cantilever form terminating in extending protrusions and lip structures.

2. A one-piece molded polishing fixture of claim 1 wherein the alignment sleeve has annular beveled front edge.

3. A one-piece molded polishing fixture according to claim 1 wherein each said catch piece comprises a tab body and terminates in said protrusion and lip structure.

4. A one-piece molded polishing fixture according to claim 3 wherein each protrusion is wider than each tab body of each catch piece.

5. A one-piece molded polishing fixture according to claim 1, 2, 3 or 4 wherein the optical fiber connector comprises an optical fiber plug assembly, the plug assembly including a plug housing with spacing through its body at a surface of a forward section and with defined exterior profile at a rearward section, a connector assembly accommodated by and substantially within said plug housing, the connector assembly having disposed at one exterior surface thereof, ridge and slot and, in conjunction therewith, tab; said ridge, slot and tab exposed through the spacing at the surface of the forward section of said plug housing, and ferrule for fixing an optical fiber on a center axis thereof and accommodated within the connector assembly.

6. The one-piece molded polishing fixture according to claim 5 wherein said fixture is attached to said optical fiber connector with front end of the fiber optical member disposed through the alignment sleeve and the bore of said fixture and with each of the said resilient catch pieces having lip structures seated within respected slot of said connector assembly.

7. A one-piece molded polishing fixture according to claim 6 wherein said lip structures are beveled inwardly to facilitate lead-in to the spacing of said plug housing as said fixture is attached to said optical fiber connector.

* * * * *